United States Patent [19]
Brewer

[11] 4,330,231
[45] May 18, 1982

[54] ADAPTER FOR TRANSPORTING HAY FEEDERS

[76] Inventor: James L. Brewer, R.F.D. 3, Box 534, Grant, Ala. 35747

[21] Appl. No.: 63,749

[22] Filed: Aug. 6, 1979

[51] Int. Cl.³ .............................................. A01K 5/00
[52] U.S. Cl. .................................. 414/24.5; 119/60; 414/607; 414/703; 414/724
[58] Field of Search .................... 414/24.5, 24.6, 685, 414/703, 446, 458, 607, 608, 721, 724, 743, 618, 622, 910–912; 119/20, 58, 60 X; 56/473.5, DIG. 9

[56] References Cited

U.S. PATENT DOCUMENTS

| | | | |
|---|---|---|---|
| 2,827,184 | 3/1958 | Mueller | 414/607 X |
| 3,892,202 | 7/1975 | Feterl | 414/446 X |
| 3,893,579 | 7/1975 | Glewwe | 414/622 X |
| 3,906,903 | 9/1975 | Vandewater | 119/60 |
| 3,949,706 | 4/1976 | Coon, Jr. | 414/458 X |
| 3,971,485 | 7/1976 | Hoppey | 414/607 X |
| 3,972,308 | 8/1976 | Ray | 414/703 X |
| 3,995,594 | 12/1976 | Rose | 119/60 |
| 4,002,147 | 1/1977 | Feterl | 414/458 X |
| 4,037,741 | 7/1977 | Smith | 414/24.5 |

Primary Examiner—Trygve M. Blix
Assistant Examiner—Terrance L. Siemens
Attorney, Agent, or Firm—Burns, Doane, Swecker & Mathis

[57] ABSTRACT

An adapter rigidly attached to a hay bale feeder enables the feeder to be transported by means of the forks of a conventional bale mover. The adapter is attached to the exterior of the feeder and includes a pair of pockets or openings for receiving the forks of the bale mover. The adapter can be retrofitted to preexisting feeders, or can be integrally attached to the feeder during a manufacturing process.

5 Claims, 5 Drawing Figures

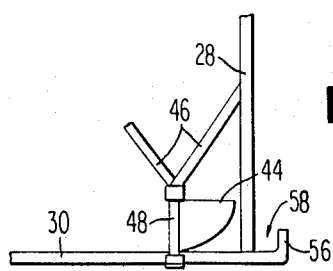
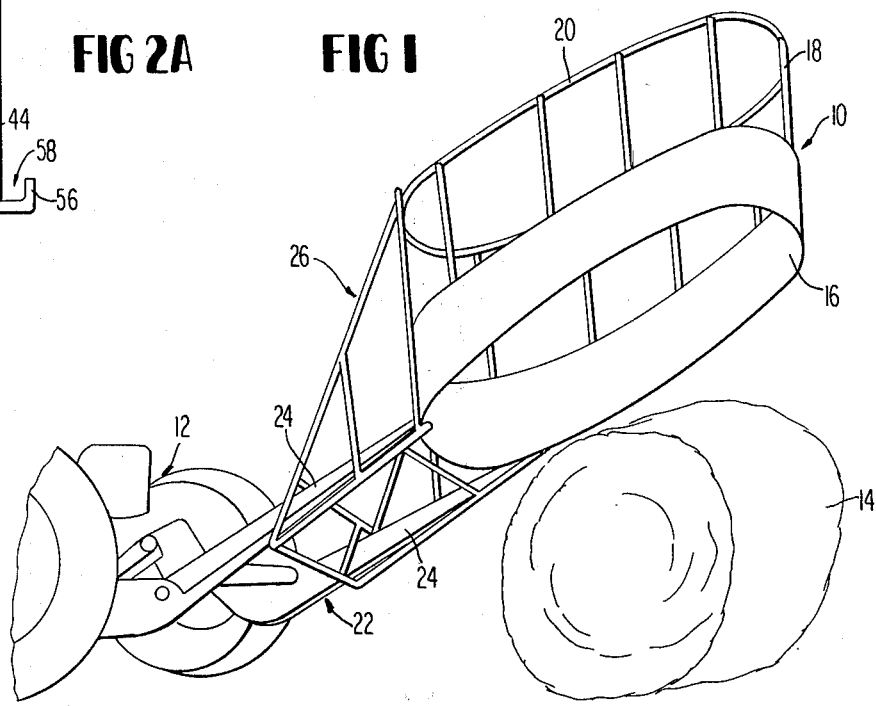
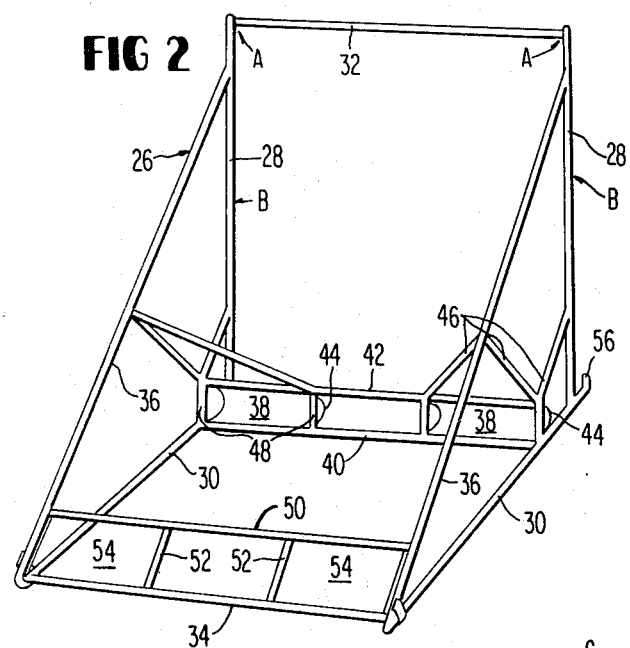
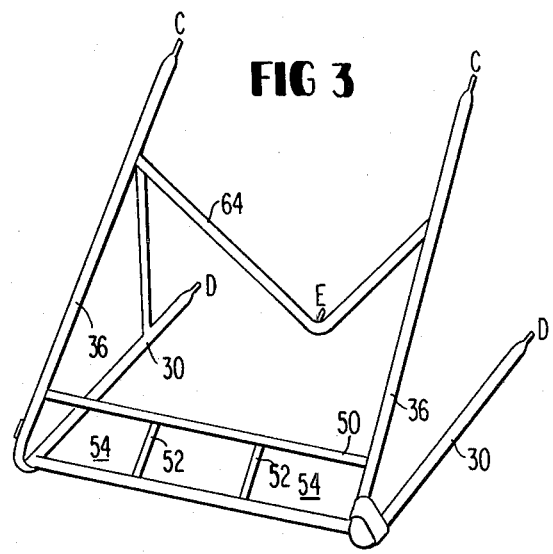
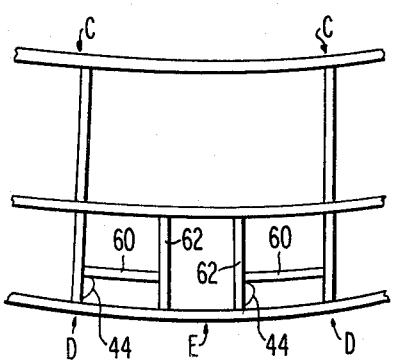

ADAPTER FOR TRANSPORTING HAY FEEDERS

BACKGROUND OF THE INVENTION

The present invention relates to a feeder for large bales of hay, and more particularly to apparatus for adapting a hay bale feeder to be transported by the forks of a conventional bale mover commonly found on most farm tractors.

At present, most hay and forage is harvested into large round bales which are substantially cylindrical in shape. These round bales are preferable over the substantially rectangular bales used in the past since they are not easily ruined by rain and the like, and therefore need not be stored in a weatherproof location. Although the round bales of hay do not require inside storage, they are normally moved to a location which is inaccessible to cattle and other farm animals and later moved to a feeding area as required by the feeding schedule of the farm animals. Moving of the bales of hay is accomplished by means of a bale mover comprising a pair of hydraulically actuated forks normally attached to the rear of the farm tractor. The forks of the bale mover are backed under a bale and then raised by the hydraulic lift on the tractor for transportation of the hay bale to the desired feeding location.

When the hay bale is moved to the feeding area, it is necessary to use a feeder to prevent the cattle from trampling and wasting up to 50 percent of the hay. The feeder consists of a substantially circular vertical wall which is placed around the bale of hay. The wall has a plurality of openings therein forming a rack through which the cattle can poke their heads to obtain access to the hay for feeding. The feeder is generally kept in the feeding area, and to place it around a bale of hay, it is necessary to lift the feeder by one edge until it is on its side, roll it to a position adjacent the bale of hay, and then lay it flat around the bale. Since the feeder is rather bulky and heavy, e.g., 8 feet in diameter and 175 pounds, the moving of the feeder in this manner to place it around a bale of hay becomes a cumbersome and difficult job. It is particularly burdensome for those people who are small in size or who have a physical handicap. In addition, movement of the feeder by rolling is not easily accomplished on hilly or rough terrain.

It is therefore a general object of the present invention to provide novel apparatus for enabling a feeder to be easily transported and placed around a bale of hay.

It is another object of the present invention to provide a novel apparatus which will enable a feeder to be transported by means of the forks of a conventional bale mover.

Feeding containers which are transported by means of a tractor are known, as shown, for example, by U.S. Pat. Nos. 3,892,202; 3,949,706; 3,995,594; and 4,002,147. Each of these patents disclose a combination bale carrier and hay feeder which can be transported by means of a farm tractor.

While the feeders disclosed in these patents can be transported in a relatively easy manner, they are subject to a number of drawbacks, the foremost of which is cost. Each of the feeding and bale handling mechanisms disclosed in the above cited patents is an integrated unit which must be purchased as an entire unit because it has parts which are specially fitted to one another. For example, the bale moving forks disclosed in U.S. Pat. No. 4,002,147 are not conventional forks commonly found on most farm tractors, and cannot be used without a heavy adapter for coupling them to the tractor lift. The feeder mechanism disclosed in the patent is specifically designed around the forks and cannot be used unless it is attached to the forks. The bale handler is fixedly attached to the feeding container during use of the container and therefore a separate bale handler must be purchased with each container.

The feeder and bale handling mechanisms disclosed in the other cited patents suffer from similar disadvantages, and each must be purchased as an entire unit. The combination of an integral feeder and bale handler may affect the ability of the bale handler to properly pick up the bale of hay and transport it, due to interference from the feeder.

In addition to the cost of purchasing these prior art mechanisms, the fact that they can only be used for a single purpose further renders these combined feeding and bale handling mechanisms uneconomical.

A further disadvantage associated with these prior art bale handling and feeding mechanisms is the time factor and inconvenience involved with their use. The cattle feeding area is a fenced in area and, as discussed previously, separate from the location at which the hay bales are stored. Access to the feeding area can only be accomplished by means of a gate. When using the combined bale handling and feeding mechanisms disclosed in the above-mentioned patents, it is necessary for the tractor operator to first drive the tractor from its storage area through the gate to the feeding area to pick up the bale moving and feeding container. The operator must then proceed through the gate to the bale storage area. At the bale storage area, it is necessary for him to get off the tractor to open the gates of the feeding container, get back on the tractor to pick the bale, get off the tractor to reclose the gates of the feeding container and get back on the tractor to drive to the feeding area. It is then necessary to proceed through the gate to deposit the bale handling and feeding container, along with the bale of hay, in the feeding area. He must then proceed through the gate for a fourth time to return the tractor to its storage area. Each time the tractor proceeds through the gate, it is necessary for the operator to get off the tractor to open the gate, get back on the tractor and drive it through the open gate, get off the tractor to reclose the gate, and then get back on the tractor to drive the tractor to the desired location, in order to prevent the animals from escaping the feeding area. It will be appreciated that four trips through the gate for each feeding operation involves a number of time consuming and inconvenient steps.

It is therefore a further object of the present invention to provide a novel feeder moving mechanism in which a bale handler is not integrally attached to the feeding container to thereby reduce the number of steps required in a feeding operation and to permit the bale handler to be used with a number of different feeders.

It is still another object of the present invention to provide a novel apparatus which can be retrofitted to conventional hay bale feeders to enable them to be transported by a conventional bale mover, to thereby enable equipment already owned by a farmer to be easily transported.

BRIEF DESCRIPTION OF THE DRAWINGS

These, as well as other objects and advantages are achieved by the present invention, the preferred embodiments of which will be understood from a perusal of the following description in conjunction with the accompanying drawings, in which:

FIG. 1 is a perspective view of a hay bale feeder carried by the forks of a bale mover and in position to be placed around a bale of hay;

FIG. 2 is a perspective view of one embodiment of an adapter which can be retrofitted to a conventional feeder to enable the feeder to be transported by a bale mover;

FIG. 2A is a side view of a portion of the adapter illustrated in FIG. 2;

FIG. 3 is a perspective view of a second embodiment of the invention illustrating an adapter which can be integrally attached to a feeder to permit the feeder to be carried by a bale mover; and FIG. 4 is a front view of a portion of a feeder illustrating the modifications made to the feeder to enable the feeder to be fitted with the adapter illustrated in FIG. 3.

DETAILED DESCRIPTION

Referring now to FIG. 1, a hay bale feeder 10 which can be transported by means of a bale mover on a tractor 12 and which is in position to be placed around a bale of hay 14 is illustrated. The feeder 10 is generally cylindrical in shape and can be formed, for example, by means of a circular wall 16 having a plurality of bars 18 upstanding therefrom for supporting a circular ring 20. The bars 18 and ring 20 form a rack having a plurality of openings through which the cattle or other farm animals can poke their heads to get at the hay located within the feeder. It will be appreciated that the illustrated feeder is only one form of the many commercially available feeders which are generally cylindrical in shape and provide a plurality of openings for cattle to obtain access to the hay.

The feeder 10 is transported by means of the bale mover 22 mounted on the tractor 12. The bale mover 22 includes two parallel forks 24 operatively connected to the hydraulic system of the tractor 12. The hydraulic system enables the forks 24 to be moved to an elevated position, as shown in FIG. 1, and to a substantially horizontal position in which they lie approximately flat on the ground. By lowering the forks 24 to their substantially horizontal position and backing the tractor 12 up to a bale of hay, the forks can be positioned under the bale of hay and then raised slightly to enable the bale to be transported from a storage location to a desired location in the feeding area.

To enable the feeder 10 to be transported by means of the forks 24 of the bale mover, an adapter 26 is attached to the exterior of the feeder 10. The adapter is rigidly fixed to the feeder and includes openings for accommodating the forks of the bale mover as well as support structure for enabling the feeder 10 to be raised by means of the forks. The adapter 26 can either be retrofitted to a preexisting feeder, as illustrated with respect to FIG. 2, or it can be integrally attached to a feeder, such as during a manufacturing process, as illustrated with respect to FIG. 3.

Referring now to FIG. 2, a preferred embodiment of an adapter, which can be retrofitted to a feeder to enable the feeder to be transported by means of the bale mover on a tractor, is illustrated. The adapter includes two substantially vertical support members 28 forming a frame and two substantially horizontal support members 30 attached to the bottom ends of the vertical support members. The upper ends of the vertical support members 28 can be connected by means of an upper cross bar 32, and the ends of the horizontal support members 30 which are remote from the connection point with the vertical support members 28 can be connected to each other by means of a lower cross bar 34. The cross bars 32, 34 should be slightly longer than the exterior width of the bale mover 22, i.e., the distance from the outside edge of one fork 24 to the outside edge of the other fork. A pair of diagonal braces 36 can be connected between the two cross bars, to provide structural strength to the adapter 26.

A pair of pockets 38 are located at the bottom of the frame near the point of intersection of the vertical support members 28 and the horizontal support members 30. The pockets 38 can be formed by means of a pair of vertically spaced cross members 40, 42 and curved metal sheets 44 attached to the cross members. The lower cross member 40 can be rigidly attached to the horizontal support members 30, and the upper cross member 42 can be rigidly secured to the frame by means of a plurality of diagonal braces 46 and vertical braces 48. The tips of the forks 24 of the bale mover are inserted into the pockets 38, and the pockets serve as stops which limit the rearward travel of the forks relative to the adapter 26. The pockets 38 are preferably wide enough to accommodate bale movers having varying widths between their forks. While two horizontally spaced pockets 38 are illustrated, it will be appreciated that a single pocket coextensive with the width of the frame can also be utilized.

To provide support during the lifting of a feeder attached to the adapter 26, a horizontal support bar 50 is attached to the diagonal braces 36 at a position horizontally spaced from the support members 28 that are attached to the feeder. A pair of braces 52 can be attached between the lower cross bar 34 and the horizontal support bar 50 to provide additional structural strength. The lower cross bar 34 and horizontal support bar 50 form openings 54 into which the forks of the bale mover are inserted as the tractor is backed towards the adapter 26.

Each of the horizontal support members 30 includes an L-shaped extension 56 which protrudes beyond the point of attachment of the horizontal support member to the vertical support member 28. These L-shaped extensions 56 form notches 58 (FIG. 2A) into which the lower edge of the feeder can be inserted to retrofit the adapter 26 to the feeder. The extensions 56 can be bent slightly inwards towards the center of the frame, if necessary, to accommodate for the curvature of the feeder 10.

To retrofit the adapter 26 to the feeder, the lower edge of the feeder is placed in the two notches formed by the L-shaped extensions 56. The two vertical support members 28 of the frame are then attached to the feeder by any suitable conventional attachment means. For example, U-bolts can be used to attach the support members 28 to either or both of the upper ring 20 or the upstanding support bars 18 of the feeder. The vertical support members 28 are preferably attached to the feeder at the top ends thereof (point A) and also approximately at the middle thereof (point B).

The rigid attachment of the adapter 26 to the feeder 10 enables the feeder to be easily transported by means of the forks of the bale mover. The forks of the bale mover are put in their lowermost, substantially horizontal, position, parallel to the ground. The tractor is backed toward the adapter 26 and feeder 10, inserting the forks 24 into the openings 54 on the adapter, until the tips of the forks are received in the pockets 38. The forks can then be raised to lift the feeder 10, in the manner illustrated in FIG. 1. During this lifting operation, the load supporting force of the forks is imparted to the lower cross bar 34 and the upper cross member 42, to lift the adapter and the feeder attached thereto. The pockets 38 prevent the feeder and adapter from sliding forward on the forks 24. If the forks are raised too high, the lower cross member 40, forming the pockets 38, and the horizontal support bar 50, forming the openings 54, prevent the feeder from tilting forward and falling onto the tractor.

Referring now to FIG. 3, a second embodiment of the invention comprising an adapter which can be integrally attached to a feeder, during a manufacturing process or the like, is illustrated. The same reference numerals are used in FIG. 3 to refer to like parts corresponding to those illustrated in FIG. 2. It will be noted that the adapter illustrated in FIG. 3 does not include vertical support members or pockets for receiving the tips of the forks of the bale mover. Rather, the feeder itself is modified to perform the functions carried out by these parts.

Referring now to FIG. 4, a portion of a feeder is illustrated, which feeder has been modified to enable it to be fitted with the adapter shown in FIG. 3. The only modifications which are necessary on the feeder are the provision of a pair of load supporting horizontal bars 60 and the attachment of curved metal sheets 44 between the bottom edge of the feeder and the load supporting bars, to form a pair of circumferentially spaced pockets. To accommodate the load supporting bars, it may be necessary to provide additional vertical bars 62 on the feeder.

The upper ends of the diagonal braces 36 provide upper points of attachment C at which the adapter can be integrally attached to the upper portion of the feeder 10, as illustrated in FIG. 4. The free ends of the horizontal support members 30 provide lower points of attachment D for connecting the adapter to the feeder. In addition, a V-shaped support bar 64 can be attached between the two diagonal braces 36 to give additional structural stability to the frame and to provide another point of attachment E between the two lower points of attachment D. The adapter can be attached to the feeder by means of welding, bolts, or any other suitable conventional forms of attachment. When attached to the feeder in this manner, the adapter will operate in the same manner as discussed with respect to FIG. 2 to enable the feeder to be transported by means of a bale mover.

For economy in shipping, a conventional hay bale feeder is manufactured as three sections each comprising 120° of curvature, which are bolted together at their destination. To fit the adapter illustrated in FIG. 3 to a feeder, it will only be necessary to modify one of the three sections of the feeder. The adapter of FIG. 3 can most easily be fitted onto the feeder during the manufacturing process, and the modified feeder section having the adapter mounted thereon can then be attached to two conventional feeder sections.

SUMMARY OF THE ADVANTAGES OF THE INVENTION

It will be appreciated that the present invention offers a number of advantages with respect to the transportation of hay bale feeders. By enabling a conventional feeder to be lifted and transported by means of a bale mover, the present invention eliminates the need for the cumbersome lifting and rolling of a feeder to transport it to a desired feeding location within a cattle feeding area. A single bale mover can be used with a number of feeders, rather than requiring a bale mover for each feeder. Furthermore, since the bale mover is not required to be an integral part of the feeder structure, substantial savings in time will be provided, and convenience will be increased. For example, during a feeding operation, it is only necessary for an operator to drive the tractor from its storage area to the hay bale area, pick up a bale of hay with the bale mover already mounted on the tractor, and bring the bale of hay into the feeding area. The bale of hay is deposited at the desired location within the feeding area, the operator then drives over to the feeder already located within the feeding area, backs the forks of the tractor into the adapter attached to the feeder, and transports the feeder to the bale of hay. The feeder is then placed around the bale of hay and the operator can then return the tractor to its storage area. It can be seen that this operation only requires two gate opening and closing steps, in contrast to the four steps required with combined bale handling and feeding mechanisms.

Furthermore, the adapter of the present invention provides a substantial savings in cost. Since a farmer is likely to already have a bale mover and one or more feeders on hand, it is only necessary for him to purchase an adapter for each feeder. The cost of such an adapter is only one fifth to one tenth of the expenditure required for a combined bale handler and feeding structure. Alternatively, if the farmer already owns two conventional three-section feeders, he can buy three feeder sections with an adapter integrally attached thereto and use these sections with the sections of the conventional feeders owned by him to construct three feeders each having an adapter integrally mounted thereon.

The present invention may be embodied in other specific forms without departing from the spirit or essential characteristics thereof. For example, instead of positioning the structural bars of the adapter to provide pockets 38 and openings 54, the horizontal support bars 30 of the adapter can be formed of tubes, sleeves channels or the like which provide elongated pockets for receiving the forks of the bale mover. Other modifications of the disclosed embodiments of the invention for achieving substantially the same result will be apparent to those of ordinary skill in the art.

The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. Apparatus for adapting a conventional hay bale feeder for transportation by a conventional hay bale carrier having forks, comprising:
    a frame having a pair of laterally spaced, substantially vertical support bars for attachment to the exterior of a hay bale feeder;
    at least one pocket located at the bottom of said frame for receiving the forks of a conventional hay bale carrier; and
    support means horizontally spaced from the points of attachment of said vertical support bars to a hay bale feeder and connected to said frame by a pair of substantially horizontal support bars respectively connected at one end to the bottom ends of said vertical support bars, for contacting the forks of a conventional hay bale carrier when the forks are inserted in said pocket to thereby receive some of the stress imparted to the frame when a hay bale feeder is transported by means of the bale carrier.

2. The apparatus of claim 1 wherein said support means comprises a horizontal bar connected to the ends of said horizontal support bars remote from the ends connected to the vertical support bars.

3. The apparatus of claim 1 wherein said pocket is comprised of a pair of vertically spaced bars connected to said frame and forming an opening therebetween.

4. The apparatus of claim 1 wherein said pocket forms a stop for limiting the movement of the forks of a bale carrier relative to said frame.

5. A hay bale feeder adapted for transportation by means of a conventional bale carrier having forks, comprising:

a substantially cylindrical structure having a plurality of openings in the sides thereof for enabling an animal to obtain access to forage located within said structure;

a pair of circumferentially spaced pockets located along the bottom edge of said substantially cylindrical structure for receiving and limiting the movement of the forks of a conventional hay bale carrier;

at least one load supporting member located at the upper edge of said pockets for receiving some of the stress imparted when the forks of a conventional hay bale carrier are inserted in said pockets and raised; and support means rigidly attached to the exterior of said substantially cylindrical structure and horizontally spaced from said pockets for also receiving some of the stress imparted when the forks of a conventional hay bale carrier are inserted in said pockets and raised.

* * * * *